USOO5589092A

United States Patent [19]
Chang

[11] Patent Number: 5,589,092
[45] Date of Patent: Dec. 31, 1996

[54] CONTROL CIRCUIT FOR CONTROLLING THE OPERATION OF A MULTIPURPOSE ELECTRONIC COOKER

[76] Inventor: Kwei-Tang Chang, No. 14, Lane 54, Luong Chuan St.,, Panchiao City, Taipei Hsien, Taiwan

[21] Appl. No.: 405,910

[22] Filed: Mar. 17, 1995

[51] Int. Cl.$^6$ .................................................. H05B 1/02
[52] U.S. Cl. ........................... 219/506; 219/497; 219/501
[58] Field of Search ..................................... 219/494, 702, 219/720, 710, 497, 501, 506, 508, 509, 519; 307/117, 118

[56] References Cited

U.S. PATENT DOCUMENTS

| | | | |
|---|---|---|---|
| 4,345,145 | 8/1982 | Norwood | 219/492 |
| 4,390,766 | 6/1983 | Horinouchi | 219/506 |
| 4,403,302 | 9/1983 | Young et al. | 364/900 |
| 4,420,669 | 12/1983 | Scalf et al. | 219/506 |
| 4,636,949 | 1/1987 | Longabaugh | 364/400 |
| 5,079,410 | 1/1992 | Payne et al. | 219/506 |
| 5,171,974 | 12/1992 | Koether et al. | 219/506 |

*Primary Examiner*—Mark H. Paschall
*Attorney, Agent, or Firm*—Merchant, Gould, Smith, Edell, Welter & Schmidt, P.A.

[57] ABSTRACT

A multipurpose electronic cooker control circuit including a rectifier filter circuit, an electronic switch for the ON/OFF control of an electric heater, a comparator circuit for temperature control, a single chip main control unit, a time and temperature display unit, a keyboard control circuit, and a buzzer, wherein the output terminal of the rectifier filter circuit is respectively connected to the input terminals of the electronic switch, the comparator circuit, the single chip main control unit, the time and temperature display unit, the keyboard control circuit and the buzzer; the output terminal of the single chip main control unit is respectively connected to the input terminals of the electronic switch, the comparator circuit, the time and temperature display unit and the buzzer; the output terminal of the comparator circuit is connected to the input terminal of the single chip main control unit; the output terminal of the keyboard control circuit is connected to the input terminal of the single chip main control unit.

6 Claims, 3 Drawing Sheets

CONTROL CIRCUIT FOR CONTROLLING THE OPERATION OF A MULTIPURPOSE ELECTRONIC COOKER

BACKGROUND OF THE INVENTION

The present invention relates to electronic cookers, and relates more particularly to a control circuit for controlling the operation of a multipurpose electronic cooker.

When frying ready-mixed frozen foods by a cooking pan, the temperature of the oil and the length of the frying time must be well controlled according to the instructions on the package of the ready-mixed frozen foods. However, it is not easy to accurately control the temperature of the oil and the length of the frying time by manual. If the temperature of the oil and the frying time are not accurately controlled, foods cannot be fried to the satisfactory condition. However, these controls need much experience to achieve.

SUMMARY OF THE INVENTION

The present invention has been accomplished under the circumstances in view. It is one object of the present invention to provide a control circuit for a multipurpose cooker which controls the cooking of the cooker according to predetermined settings. It is another object of the present invention to provide a control circuit which permits the frying oil to be used repeatedly. It is still another object of the present invention to provide a control circuit for a multipurpose cooker which has a self-test function and a zero-error control.

According to the preferred embodiment of the present invention, the control circuit comprises a rectifier filter circuit, an electronic switch for the ON/OFF control of an electric heater, a comparator circuit for temperature control, a single chip main control unit, a time and temperature display unit, a keyboard control circuit, and a buzzer, wherein the output terminal of the rectifier filter circuit is respectively connected to the input terminals of the electronic switch, the comparator circuit, the single chip main control unit, the time and temperature display unit, the keyboard control circuit and the buzzer; the output terminal of the single chip main control unit is respectively connected to the input terminals of the electronic switch, the comparator circuit, the time and temperature display unit and the buzzer; the output terminal of the comparator circuit is connected to the input terminal of the single chip main control unit; the output terminal of the keyboard control circuit is connected to the input terminal of the single chip main control unit.

DETAILED DESCRIPTION OF THE PREFERRED EMBODIMENT

Figure 1:
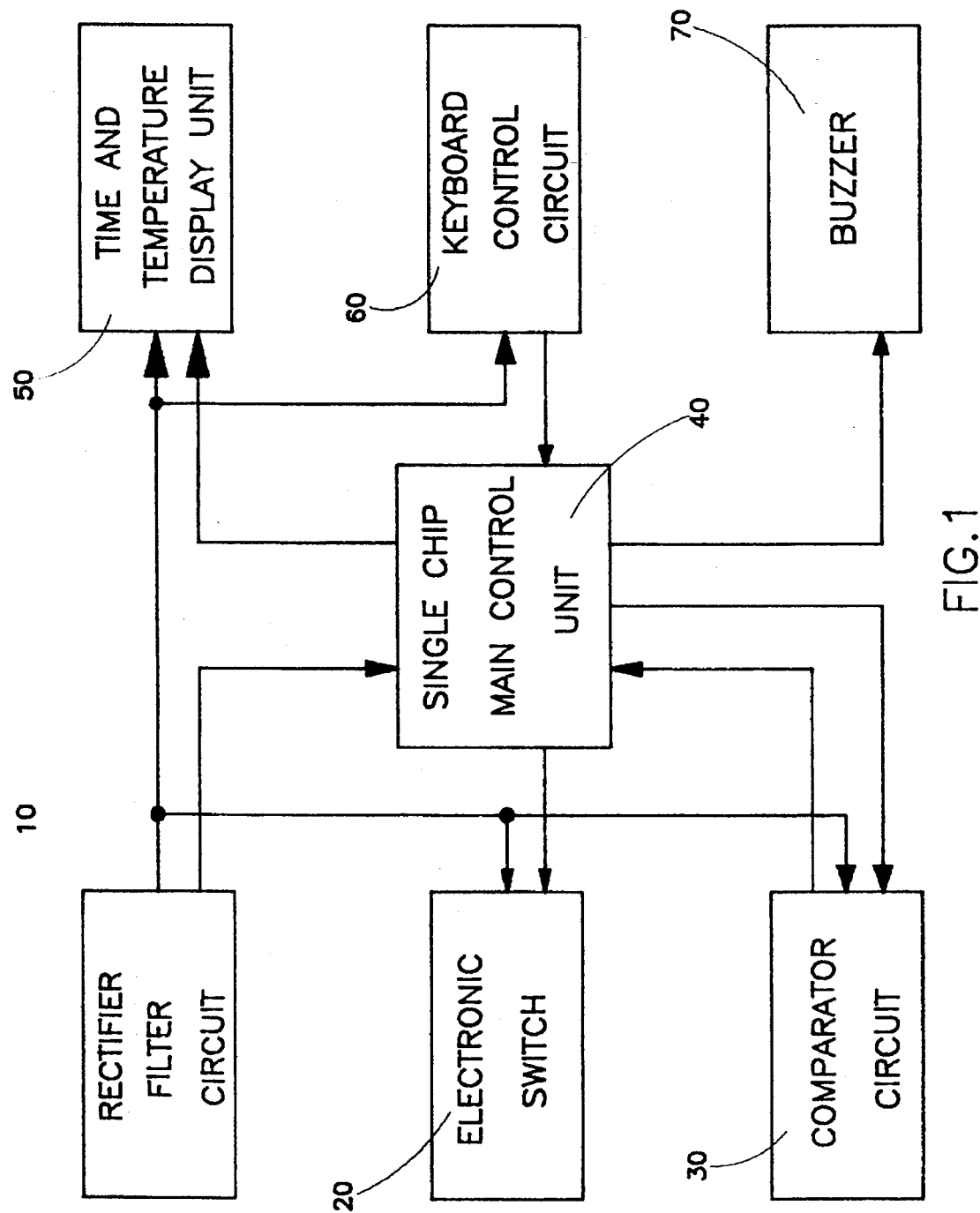
FIG. 1 is a circuit block diagram according to the present invention.
Figure 2:
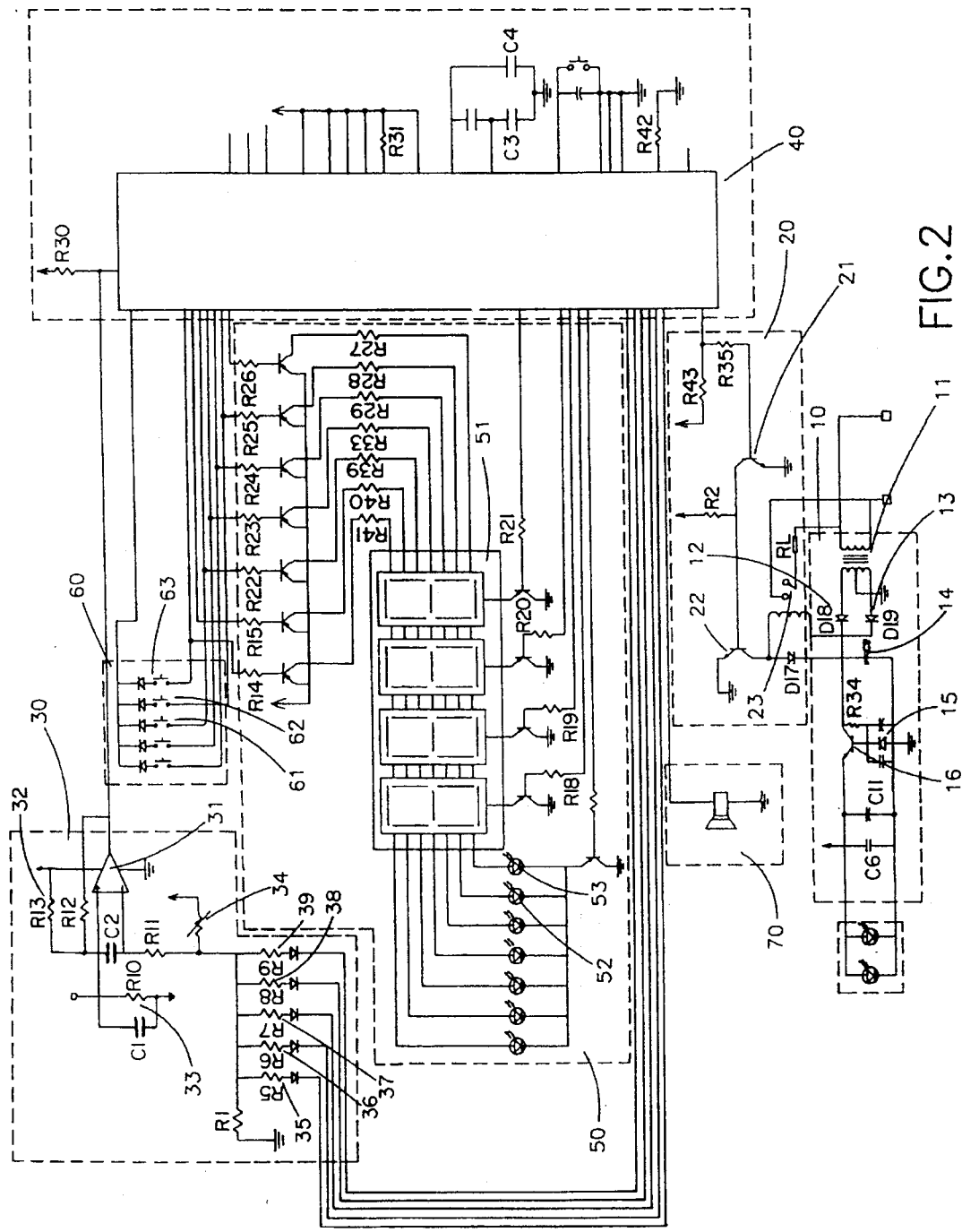
FIG. 2 is a detailed circuit diagram of the control circuit according to the present invention.

Referring to FIGS. 1 and 2, the control circuit of the present invention comprises a rectifier filter circuit 10, an electronic switch 20 for the ON/OFF control of an electric, a comparator circuit 30 for temperature control, a single chip main control unit 40, a time and temperature display unit 50, a keyboard control circuit 60, and a buzzer 70. The output terminal of the rectifier filter circuit 10 is respectively connected to the input terminals of the electronic switch 20, the comparator circuit 30, the single chip main control unit 40, the time and temperature display unit 50, the keyboard control circuit 60 and the buzzer 70. The output terminal of the single chip main control unit 40 is respectively connected to the input terminals of the electronic switch 20, the comparator circuit 30, the time and temperature display unit 50 and the buzzer 70. The output terminal of the comparator circuit 30 is connected to the input terminal of the single chip main control unit 40. The output terminal of the keyboard control circuit 60 is connected to the input terminal of the single chip main control unit 40.

The rectifier filter circuit 10 comprises a transformer 11 to drop city power supply to 7.5VAC×2, rectifying diodes 12 and 13 to rectify processed power supply from the transformer 11 into full-wave DC power supply, an electrolytic capacitor 14 to filtrate full-wave DC power supply from the rectifying diodes 12 and 13, a zener diode 15 and a transistor 16 to process filtrated DC power supply from the electrolytic capacitor 14 to 5 V power supply for the posterior circuits.

The electronic switch 20 comprises a relay 23, and two transistors 21 and 22 controlled by the single chip main control unit 40 to drive the relay 23, causing it to turn on/off the electric heater.

The comparator circuit 30 comprises a comparator 31, a plurality of shunt resistors 32, 33, 35, 36, 37, 38 and 39, and a thermister 34. The comparator 31 compares the temperature signal from the thermister 34 with the reference signal from the single chip main control unit 40 and then sends the comparison result to the single chip main control unit 40 for driving the electronic switch 20 and the time and temperature display unit 50.

The time and temperature display unit 50 is controlled by the single chip main control unit 40 to display time and temperature data provided by the single chip main control unit 40, comprising a display screen 51, and a plurality of LEDs (light emitting diodes) 52 and 53. The keyboard control circuit 60 comprises a plurality of keys 61, 62, and 63. When the first key 61 of the keyboard control circuit 60 is depressed once, the display screen 51 is added with one minute. If the first key 61 is maintained depressed, the display data will be increased continuously. If the second key 62 is depressed once, one minute will be deducted from the display screen 51. If the third key 63 is depressed when the time is zeroed, the cooker starts to cook. When the cooker starts to cook, the LEDS 52 and 53 are turned on, the display screen 51 shows 25 minutes, and the single chip main control unit 40 controls the operation of the electronic switch 20 and the comparator circuit 30 and counts down the time. When the time is up (zero reading), the single chip main control unit 40 gives a signal to the buzzer 70, causing it to buzz.

Figure 3:
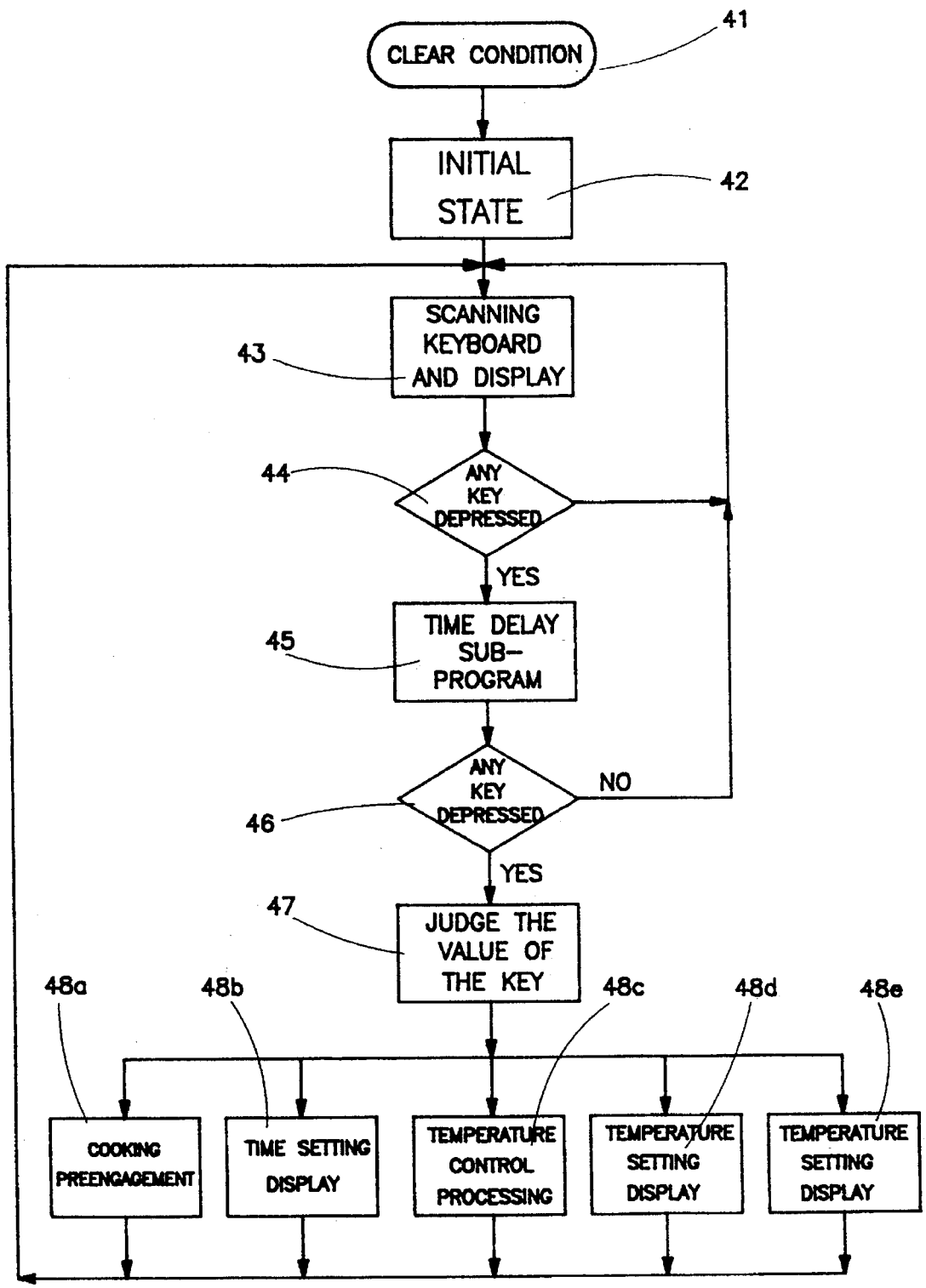
FIG. 3 is a control flow chart of the single chip main control unit according to the present invention.

FIG. 3 shows the control flow of the single chip main control unit 40. When started, it proceeds from clear condition (zero reading condition) of step 41 to initial state of step 42, then to step 43 to scan keyboard and display, and then step 44 to judge if any key is depressed. If no key is depressed, it returns to step 43. If there is a key depressed, it immediately proceeds to time delay sub-program of step 45, and then to step 46 to judge if any key is depressed. If no key is depressed at this stage, it returns to step step 43. If a key is depressed at this stage, it immediately proceeds to step 47 to judge the value of the key, and then proceeds to cooking preengagement 48a, time setting display 48b, temporary control processing 48c, and temperature setting display 48d and 48e respectively.

It is to be understood that the drawings are designed for purposes of illustration only, and are not intended as a definition of the limits and scope of the invention disclosed.

What is claimed is:

1. A multipurpose electronic cooker control circuit, comprising:

a rectifier filter circuit;

an electronic switch for ON/OFF control of an electric heater;

a comparator circuit for temperature control;

a single chip main control unit;

a time and temperature display unit;

a keyboard control circuit;

a buzzer;

wherein the rectifier filter circuit has first and second output terminals, the first output terminal of said rectifier filter circuit is respectively connected to first input terminals of said electronic switch, said comparator circuit, said time and temperature display unit, said keyboard control circuit, and said buzzer, the second output terminal of said rectifier filter circuit is connected to a first input terminal of the single chip main control unit;

wherein the single chip main control unit has first, second, third, and fourth output terminals, the first output terminal of said single chip main control unit is connected to a second input terminal of said electronic switch, the second output terminal of said single chip main control unit is connected to a second input terminal of said comparator circuit, the third output terminal of said single chip main control unit is connected to a second input terminal of said time and temperature display unit, the fourth output terminal of said single main control unit is connected to an input terminal of said buzzer;

wherein an output terminal of said comparator circuit is connected to a second input terminal of said single chip main control unit; and wherein an output terminal of said keyboard control circuit is connected to a third input terminal of said single chip main control unit.

2. The multipurpose electronic cooker control circuit of claim 1, wherein said rectifier filter circuit comprises a transformer having one side connecting to an outside power supply to drop a voltage thereof and having a second side connecting to at least two rectifying diodes at two respective ends of the transformer on the second side, an electrolytic capacitor connecting to the at least one of the rectifying diodes to filtrate power supply from said rectifying diodes, another one of the rectifying diodes is connected to one end of a transistor, and a zener diode is connected to a second end of the transistor, so as to process filtrated DC power supply from said electrolytic capacitor to a desired working voltage for posterior circuits.

3. The multipurpose electronic cooker control circuit of claim 1, wherein said electronic switch comprises a relay, and first and second transistors controlled by said single chip main control unit to drive said relay, causing the relay to turn on/off an electric heater, the first transistor has a gate connected to the single chip main control unit, a source connected to ground, and a drain connected to a gate of the second transistor, a source of the second transistor is connected to ground, and a drain of the second transistor is connected to the rectifier filter circuit.

4. The multipurpose electronic cooker control circuit of claim 1, wherein said comparator circuit comprises a comparator, a plurality of shunt resistors, and a thermister, said comparator comparing a temperature signal obtained from said thermister with a predetermined reference signal provided by said single chip main control unit and then sending a comparison result to said single chip main control unit for driving said electronic switch and said time and temperature display unit.

5. The multipurpose electronic cooker control circuit of claim 1, wherein said time and temperature display unit is controlled by said single chip main control unit to display time and temperature data provided by said single chip main control unit, the time and temperature display unit comprises:

a display screen and a plurality of light emitting diodes;

said keyboard control circuit comprises a first key control to increase reading of said display screen, a second key controlled to reduce the reading of said display screen, and a third key controlled to start cooking; and wherein said light emitting diodes is turned on and said display screen shows a 25-minute display when said third key is depressed to start cooking and at the same time said single chip main control unit is driven to control operation of said electronic switch and said comparator circuit and to count down time, said single chip main control unit gives a signal to said buzzer when the time is zeroed, causing said buzzer to buzz.

6. The multipurpose electronic cooker control circuit of claim 1, further comprising a keyboard control circuit, operation of the multipurpose electronic cooker control unit comprising the steps of:

initiating the single chip main control unit to proceed from a condition to initial state;

scanning keyboard and display of the keyboard control circuit;

judging if any key of the keyboard is depressed so as to return to the step of scanning keyboard and display if no key is depressed or to proceed to time delay sub-program if a key is depressed;

judging again if any key is depressed so as to return to the step of scanning keyboard and display if no key is depressed or to proceed to the step of judging a value of the key if a key is depressed; and proceeding to sub-programs of cooking preengagement, time setting display, temporary control processing, and temperature setting display, respectively.

\* \* \* \* \*